(No Model.)
G. W. WARREN & F. D. CLARK.
TRELLIS.
No. 581,896. Patented May 4, 1897.
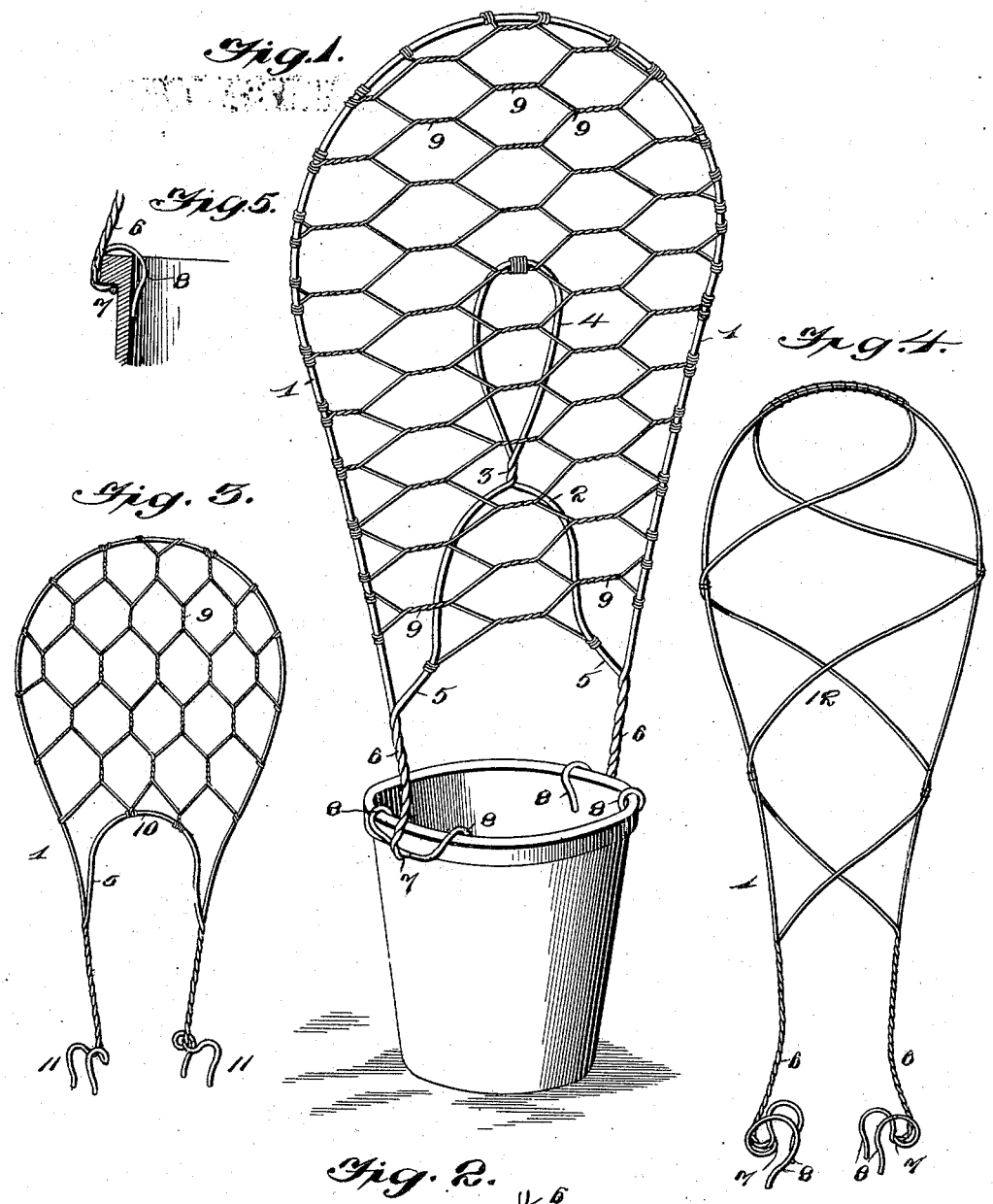
Witnesses
Inventors
George W. Warren
Fred D. Clark,
By their Attorneys,

UNITED STATES PATENT OFFICE.

GEORGE W. WARREN AND FRED D. CLARK, OF PRATTSBURG, NEW YORK.

TRELLIS

SPECIFICATION forming part of Letters Patent No. 581,896, dated May 4, 1897.

Application filed July 20, 1896. Serial No. 599,863. (No model.)

*To all whom it may concern:*

Be it known that we, GEORGE W. WARREN and FRED D. CLARK, citizens of the United States, residing at Prattsburg, in the county of Steuben and State of New York, have invented a new and useful Trellis, of which the following is a specification.

This invention relates to improvements in trellises for flower-pots and similar receptacles; and the object of the invention is to provide a trellis of the character mentioned which is adapted to support and train plants of any size grown in flower-pots and similar receptacles and so to construct the trellis as to permit the same to be readily attached to or detached from receptacles of various designs, shapes, and sizes.

The invention further aims to provide a trellis the use of which will not disfigure the plants or interfere with the roots thereof and will enable the receptacle to be easily lifted and moved, the trellis serving in the capacity of a handle and firmly holding such receptacle.

With these objects in view the invention consists, substantially, in the construction, combination, and arrangements of parts, as will be hereinafter fully illustrated, described, and claimed.

In the accompanying drawings, Figure 1 is a perspective view of a trellis constructed in accordance with the present invention and illustrated in applied position. Fig. 2 is a detail perspective view of the lower portion of one side of the trellis and illustrating the means for holding the trellis upon a flower-pot or similar receptacle. Figs. 3 and 4 are perspective views, on a reduced scale, of modifications of the trellis. Fig. 5 is a detail sectional view of the lower portion of one side of the trellis, showing the clutch in position upon a flower-pot.

Similar numerals of reference indicate corresponding parts throughout the figures.

Referring to the drawings, 1 designates a body-frame which is preferably formed of steel wire and is bent into a substantially inverted-U shape or any other desired form.

Within the body-frame 1 is a centrally-arranged brace-frame 2, which brace-frame is formed of the same material as said body-frame and conforms to the general contour thereof. The brace-frame 2, as it will be noted, is bent from a single piece, and the sides of the brace-frame are twisted, as at 3, so as to form a substantially elliptical-shaped loop 4, which lies at approximate center of the body-frame 1. The sides of the brace-frame 2, below the twisted portion 3, diverge and extend substantially parallel with the sides of the body-frame 1 to a point adjacent to the lower portions of said sides of the body-frame, where they are sharply bent outwardly, as at 5, and are twisted with the lower terminals of the sides of said body-frame for any desired distance, as indicated at 6.

The lower end of each of the twisted portions 6 is bent outwardly and then provided with a sharp inward curve to form a contact-point 7, which is adapted to bear against the under side of the rim of a flower-pot or similar receptacle for a purpose to be presently explained. Extending in opposite directions from the contact-points 7 the lower terminals of the sides of the body-frame and the brace-frame 2 are separated and bent to form attaching-hooks 8, which consist of upper curved portions to extend over the upper edge of a flower-pot and depending portions to engage the inner face thereof, the contact-point and the hooks at each side of the trellis constituting a spring-catch. It will therefore be seen that by reason of said terminals being bent into the hooks 8 said hooks may be placed over the sides of a flower-pot or similar receptacle and project on the interior thereof, the contact-points 7 extending beneath the rim of said pot and together with the attaching-hooks clutching the pot to securely hold the trellis upon the same.

A filling 9 is secured to the body-frame 1 and extends thereover to provide a surface upon which a plant may be supported and trained, and said filling may be of any preferred construction and of any suitable material adapted for the purpose to which it is applied.

In Fig. 3 a modification of the trellis is illustrated, and in this form it will be noted that the brace-frame is arched, as at 10, the loop 4 being dispensed with, but the lower terminals of the sides of the brace-frame being twisted with the lower terminals of the sides of the body-frame 1, as in Fig. 1. It is also to be observed that the means for attaching the trellis to a flower-pot or similar receptacle is slightly changed, the twisted portion of the sides being straight, but the lower terminals of the sides of the body-frame and the brace-frame being separated and bent to form attaching-hooks 11, said hooks extending in opposite directions to the hooks 8 (shown in Fig. 1. This modified construction provides a trellis which, though not as strong as the form shown in Fig. 1, is sufficient for use with small plants.

Fig. 4 also represents a further modification, and in this form it will be seen that the brace-frame is again differently arranged, said frame having its sides spirally wound, as at 12, around the body-frame 1, and the lower terminals of said sides twisted with the lower terminals of the sides of the body-frame in a manner similar to that shown in Figs. 1 and 3. The twisted portion of the sides and the attaching-hooks in this form are the same as shown in Fig. 1, and by arranging the brace-frame as described the trellis is adapted for use with tall plants, it being obvious that the latter may readily pass up through the center of the trellis and be supported by the convolutions of the brace-frame.

While we have shown modifications of the trellis in Figs. 3 and 4, the form illustrated in Fig. 1 is preferred from the fact that the same is stronger and thereby better adapted for a variety of uses, and by constructing the attaching-hooks so as to provide clutches the trellis will be securely held upon a flower-pot or similar receptacle without liability of displacement.

The manner of using the herein-described trellis will be apparent to those skilled in the art. When it is desired to apply the same to a flower-pot or similar receptacle, the attaching-hooks 8 are placed over the sides thereof at opposite points and the contact-points forced beneath the rim, as described. This will securely hold the trellis upon the pot, and by reason of the brace-frame 2 being connected to the sides of the body-frame 1 and extending in the position illustrated and described it will be seen that said brace-frame strengthens said body-frame and at the same time firmly braces the filling 9, which covers the trellis, so that as the plant rests against said filling the latter will be prevented from bending and retain its original shape and also the grace of the trellis.

From the foregoing it will be seen that we have provided a trellis which is simple, inexpensive, durable, and efficient and also one which is adapted to support and train plants of any size grown in flower-pots and similar receptacles and so constructed as to permit the same being readily attached to or detached from receptacles of various designs, shapes, and sizes. By the use of the trellis the plants will not be disfigured, nor will the roots thereof be interfered with, but said trellis may serve in the capacity of a handle and thus permit the flower-pots or similar receptacles to be easily lifted and moved, a feature which is very desirable in crowded flower-stands and conservatories when the plants are to be watered or moved for other purposes. Furthermore, the trellis may be attached to receptacles having either straight or sloping sides and constructed of thick or thin material, and in the event that it is desired to suspend the receptacles in which the plants are growing it will also be seen that the same may be accomplished from the fact that the trellis is securely held thereon and will thereby firmly hold the receptacle in such suspended position.

Having thus described the invention, what is claimed as new, and desired to be secured by Letters Patent, is—

1. A trellis, comprising a body-frame, a brace-frame connected thereto and adapted to strengthen the same, and means for attaching the trellis to a flower-pot or similar receptacle, substantially as set forth.

2. A trellis, comprising a body-frame, and a brace-frame connected to said body-frame and adapted to strengthen the same, the ends of said brace-frame being connected to the ends of the body-frame and forming clutches adapted to hold the trellis upon a flower-pot or similar receptacle, substantially as set forth.

3. A trellis, comprising a body-frame, and a brace-frame connected to said body-frame, the ends of said brace-frame and the body-frame being twisted and forming clutches adapted to secure the trellis detachably to a flower-pot or similar receptacle, substantially as set forth.

4. A trellis, comprising a body-frame, and a brace-frame connected to said body-frame, formed of a single piece and having its sides twisted to provide a loop arranged at approximately the center of the body-frame, said sides being extended from said loop and together with the sides of the body-frame twisted and forming clutches adapted to secure the trellis to a flower-pot or similar receptacle, substantially as set forth.

5. A trellis, comprising a body-frame, and a brace-frame connected to said body-frame and adapted to strengthen the same, said brace-frame being formed of a single piece and having its sides twisted to form a loop, said sides diverging from said loop and having their lower terminals twisted with the lower terminals of the sides of the body-frame, the terminals of each side of the body-frame and the brace-frame at each side of the trellis extending in opposite directions and forming attaching-hooks adapted to secure the trellis to a flower-pot or similar receptacle, and a filling secured to the body-frame and extending thereover, substantially as set forth.

6. A trellis, comprising a body-frame, and a brace-frame connected to said body-frame and adapted to strengthen the same, said brace-frame being formed of a single piece and having its sides twisted to provide a loop arranged at approximately the center of the body-frame, said sides diverging from said loop and each having its lower terminal twisted with the lower terminal of one side of the body-frame, said twisted terminals of the body-frame and the brace-frame being bent outwardly and provided with a sharp inward curve to form a contact-point, the terminals of each side of the body-frame and the brace-frame at each side of the trellis extending in opposite directions from said contact-point and being bent to form attaching-hooks, the contact-point and attaching-hooks at each side of the trellis constituting a clutch, said clutches being adapted to secure the trellis to a flower-pot or similar receptacle, substantially as set forth.

7. A trellis comprising a body-frame and a brace-frame having hooked terminals bent outwardly and provided with a sharp inward curve to form contact-points for engaging the outer face of a flower-pot under the rib or shoulder at the top thereof, the hooks being arranged in pairs at the contact-point of each side of the trellis, and consisting of upper curved portions to extend over the upper edge of a flower-pot and depending portions forming contact-points for engaging the interior of a flower-pot, said hooked terminals forming spring-catches, substantially as described.

8. A trellis, comprising a body-frame having a hook or clutch at each of its sides, and a brace-frame having a hook or clutch at each of its sides, said brace-frame having a portion of its length above the hooks or clutches twisted together with the body-frame, substantially as set forth.

9. A trellis, comprising a body-frame having a hook or clutch at each of its sides, a brace-frame having a hook or clutch at each of its sides, said brace-frame having a portion of its length above the hooks or clutches twisted together with the body-frame, and a filling secured to the body-frame, said brace-frame extending across the space bounded by the body-frame and connected to said filling, substantially as set forth.

In testimony that we claim the foregoing as our own we have hereto affixed our signatures in the presence of two witnesses.

GEORGE W. WARREN.
FRED D. CLARK.

Witnesses:
S. D. CORNELL,
J. A. BENNETT.